United States Patent [19]

Fujio et al.

[11] Patent Number: 5,351,777
[45] Date of Patent: Oct. 4, 1994

[54] REAR WHEEL TURNING SYSTEM FOR VEHICLE AND METHOD OF NEUTRAL ADJUSTMENT OF THE SAME

[75] Inventors: Koji Fujio; Yutaka Tagashira, both of Hiroshima, Japan

[73] Assignee: Mazda Motor Corporation, Hiroshima, Japan

[21] Appl. No.: 883,488

[22] Filed: May 15, 1992

[30] Foreign Application Priority Data

May 17, 1991 [JP] Japan .................................. 3-113020
May 23, 1991 [JP] Japan .................................. 3-118504

[51] Int. Cl.⁵ .............................................. B62D 7/14
[52] U.S. Cl. ...................................... 180/140; 280/91
[58] Field of Search .................. 180/140, 143; 280/91

[56] References Cited

U.S. PATENT DOCUMENTS

| | | | |
|---|---|---|---|
| 4,953,648 | 9/1990 | Ohmura | 180/140 X |
| 4,982,804 | 1/1991 | Kanazawa et al. | 180/140 |
| 5,193,638 | 3/1993 | Fujio et al. | 180/140 |

FOREIGN PATENT DOCUMENTS

273772 1/1989 Japan .
274663 11/1990 Japan .

*Primary Examiner*—David M. Mitchell
*Assistant Examiner*—Andrew C. Pike
*Attorney, Agent, or Firm*—Sixbey, Friedman, Leedom & Ferguson

[57] ABSTRACT

When incorporating a rear wheel turning system having a mechanical system and hydraulic system, an end of the displacement transmission member, which transmits displacement of the output member of the rear wheel turning system to the hydraulic system and the rear wheel turning shaft, is fixed to the vehicle body in such a position that the leftward maximum displacement of the rear wheel turning shaft is equal to the rightward maximum displacement of the rear wheel turning shaft when the input shaft of the rear wheel turning system is rotated in one direction and the other by the same angles.

4 Claims, 10 Drawing Sheets

REAR WHEEL TURNING SYSTEM FOR VEHICLE AND METHOD OF NEUTRAL ADJUSTMENT OF THE SAME

BACKGROUND OF THE INVENTION

1. Field of the Invention

This invention relates to a rear wheel turning system for a vehicle which turns the rear wheels of the vehicle in response to turning of the front wheels through a mechanical system and a hydraulic system and to a method of neutral adjustment of the rear wheel turning system for adjusting the rear wheel turning system so that when the mechanical system is in the neutral position where it holds the rear wheels straight ahead, the hydraulic system is in the neutral position where it doesn't apply hydraulic pressure to the mechanical system and when the hydraulic system is in the neutral position, the mechanical system is in the neutral position.

2. Description of he Prior Art

There has been known a four-wheel steering system in which the rear wheels are turned in response to turning of the front wheels. As the system for turning the rear wheels in such a four-wheel steering system, there has been known a rear wheel turning system which, as disclosed for instance in Japanese Unexamined Patent Publication No. 1(1989)-273772, comprises a mechanical system for displacing a rear wheel turning shaft to turn the rear wheels and a hydraulic system for assisting the mechanical system in displacing the rear wheel turning shaft. The mechanical system comprises an input shaft into which the front wheel turning amount is input, an output rod member which receives input from the input shaft and makes a stroke in its axial direction, a yoke assembly which is connected to the output rod member and is supported for swinging motion, and a displacement transmission means which is connected to the output rod member, the rear wheel turning shaft, and the vehicle body and transmits the stroke of the output rod member to the rear wheel turning shaft. The stroke of the output rod member for a given rotating angle of the input shaft is controlled according to the swinging angle of the yoke assembly. The hydraulic system comprises a power steering means which is connected to the rear wheel turning shaft and assists the mechanical system in displacing the rear wheel turning shaft, and a hydraulic switching valve which is connected to the displacement transmission means and controls the power steering means. That is, the mechanical system and the hydraulic system are connected with each other by way of the displacement transmission means and the hydraulic switching valve.

In such a rear wheel turning system, the stroke of the output rod member, i.e., the amount of displacement of the rear wheel turning shaft, is determined depending on the rotating angle of the input shaft and the swinging angle of the yoke assembly in the mechanical system and the power steering system assists the mechanical system in displacing the rear wheel turning shaft by the amount.

Accordingly, in order to accurately control turning of the rear wheels, the mechanical system and the hydraulic system must be connected with each other so that one of the hydraulic system and the mechanical system is never in the neutral position but the other is in the neutral position.

When connecting the mechanical system and the hydraulic system, the mechanical system (the input shaft and the yoke assembly) is first adjusted to the neutral, and then the displacement transmission means is connected to the mechanical system (that is, to the output rod member and the rear wheel turning shaft). Thereafter, the hydraulic switching valve is incorporated and the supporting portion at which the displacement transmission means is supported by the vehicle body is determined, with the hydraulic pressure applied, so that the neutral of the mechanical system and that of the hydraulic system conform to each other, whereby deviation from the neutral of the hydraulic switching valve itself due to inaccuracy in machining and the like can be cleared and slip of the neutrals of the systems relative to each other can be absorbed.

Generally the rear wheel turning system is provided with a centering spring on the rear wheel turning shaft, and when the hydraulic system loses hydraulic pressure or when the mechanical system fails and the hydraulic system is drained to release hydraulic pressure from the power steering system, the centering spring holds the rear wheel turning shaft in the neutral position where it holds the rear wheels straight ahead. That is, in the case of failure in the systems, the centering spring provides so-called fail-safe function.

When the steering wheel is turned with the rear wheel turning shaft in the neutral position and the hydraulic switching valve is operated to increase the hydraulic pressure acting on the rear wheel turning shaft, the rear wheels are not turned and held in the neutral position until the hydraulic pressure acting on the rear wheel turning shaft exceeds the force of the centering spring. That is, there is a dead zone where the rear wheels are not turned even if the front wheels are turned.

The supporting portion of the displacement transmission means at which the displacement transmission means is connected to the vehicle body may be adjusted to the neutral position by measuring the stroke of the rear wheel turning shaft (output shaft) in response to displacement of the supporting portion with the hydraulic system applied with hydraulic pressure, thereby finding the dead zone where the output shaft is not displaced in response to displacement of the supporting portion, and fixing the supporting portion in the position corresponding to the center of the dead zone. In this manner the rear wheel turning system can be adjusted so that one of the hydraulic system and the mechanical system is never in the neutral position but the other is in the neutral position.

However when the stroke of the rear wheel turning shaft (output shaft) in response to displacement of the supporting portion is measured, there is produced hysteresis in the stroke characteristics of the rear wheel turning shaft and the width of the dead zone fluctuates due to existence of the centering spring of the rear wheel turning shaft and coned disc springs on opposite ends of the centering spring and due to mechanical backlash such as clearance between engagement portions, backlash of gears, and the like which is inherent to the mechanical system.

Accordingly, in accordance with the method described above, the neutral position cannot be determined with a high accuracy though it can be determined that the neutral position is to be within a certain range.

When the neutrals of the hydraulic system and the mechanical system conform to each other, the maximum displacement of the rear wheel turning shaft when the input shaft is rotated from its neutral position in the clockwise direction is equal to that when the input shaft is rotated from its neutral position in the counterclockwise direction so long as the rotational angles are the same.

In other words, by adjusting the position of the supporting portion so that the leftward maximum displacement of the rear wheel turning shaft is equal to the rightward maximum displacement of the rear wheel turning shaft, the neutrals of the hydraulic system and the mechanical system can conform to each other.

Further the narrower the dead zone is, the more accurately the neutral position can be determined. Accordingly there is a demand for the rear wheel turning system having a narrower dead zone.

SUMMARY OF THE INVENTION

In view of the foregoing observations and description, the primary object of the present invention is to provide a method of neutral adjustment in which the neutrals of the hydraulic system and the mechanical system can be conformed to each other with a high accuracy without being affected by the hysteresis.

Another object of the present invention is to provide a rear wheel turning system which has a narrow dead zone, thereby facilitating the neutral adjustment.

The present invention provides a method of neutral adjustment for the rear wheel turning system having a mechanical system which displaces a rear wheel turning shaft in the transverse direction of the vehicle to turn the rear wheels and a hydraulic system which assists the mechanical system in displacing the rear wheel turning shaft. The hydraulic system comprises a piston-and-cylinder mechanism having a piston fixed to the rear wheel turning shaft and received in a cylinder to form first and second pressure chambers, a hydraulic circuit which applies hydraulic pressure to the piston-and-cylinder mechanism, and a hydraulic switching valve which can take a neutral position where it causes the hydraulic circuit to apply no hydraulic pressure to the piston, a first position where it causes the hydraulic circuit to apply hydraulic pressure to the first pressure chamber of the piston-and-cylinder mechanism, and a second position where it causes the hydraulic circuit to apply hydraulic pressure to the second pressure chamber. The mechanical system comprises an input member which is connected to the system for turning the front wheels and is rotated in response to turning of the front wheels to input the amount and direction of turning of the front wheels into the mechanical system, a rear wheel turning ratio changing means which changes an amount by which an output member is displaced for a given amount of turning of the front wheels and a direction in which the output member is displaced for a given direction of turning of the front wheels according to predetermined rear wheel turning characteristics, and a displacement transmission means which is connected to the output member at a first end, to the rear wheel turning shaft at a second end, to a vehicle body at a third end, and to the hydraulic switching valve of the hydraulic system at a fourth end to transmit the displacement of the output member to the rear wheel turning shaft and the hydraulic switching valve, the hydraulic switching valve being to be held in the neutral position when the front wheels are in the neutral position, being to be moved to the first position when the output member is displaced in one direction, and being to be moved to the second position when the output member is displaced in the other direction.

In accordance with a first aspect of the present invention, the method of neutral adjustment of the rear wheel turning system comprises the steps of incorporating the rear wheel turning system in the vehicle body with said third end of the displacement transmission means temporarily held stationary in one position relative to the vehicle body, setting the rear wheel turning ratio changing means in an arbitrary position except the position where the output member is not displaced irrespective of whether the input member is rotated, rotating the input member in one direction and the other by the same angles about a neutral angular position of the input shaft where it is held when both the front wheels and the rear wheels are held straight ahead while a hydraulic pressure is applied to the piston-and-cylinder mechanism, measuring a maximum displacement of the rear wheel turning shaft when the input member is rotated in one direction and a maximum displacement of the rear wheel turning shaft when the input member is rotated in the other direction, calculating the average of the maximum displacements, and moving said third end of the displacement transmission means to the position where the rear wheel turning shaft is displaced by the average of the maximum displacements and fixing said third end of the displacement transmission means there.

In accordance with a second aspect of the present invention, the method of neutral adjustment of the rear wheel turning system comprises the steps of a method of neutral adjustment of the rear wheel turning system comprising the steps of monitoring change in the feeding hydraulic pressure of the hydraulic system while displacing said third end of the displacement transmission means with the hydraulic system applied with hydraulic pressure and fixing the third end of the displacement transmission means in the position where the feeding hydraulic pressure is minimized.

The rear wheel turning system in accordance with the present invention is characterized in that said hydraulic switching valve is provided with an urging means which presses the valve spool against said third end of the displacement transmission means in one direction.

DESCRIPTION OF THE PREFERRED EMBODIMENT

Figure 1:
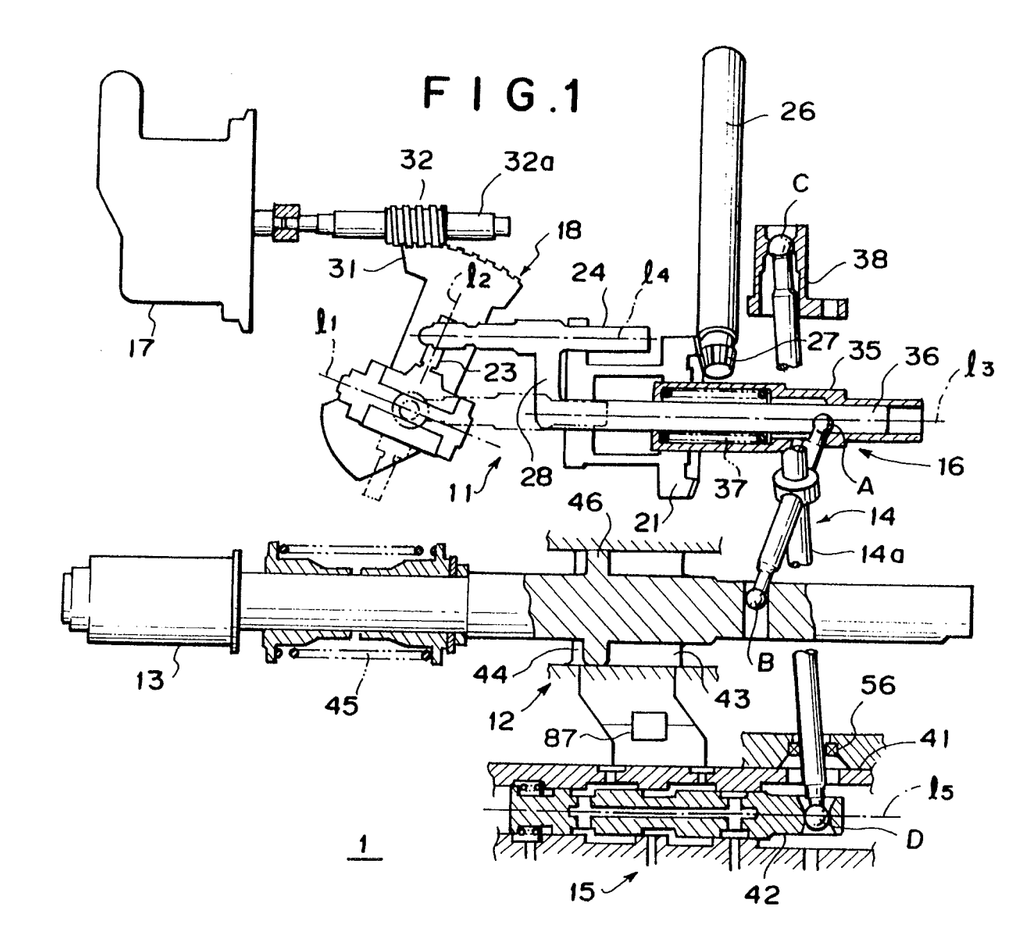
FIG. 1 is a schematic view showing a rear wheel turning system to which the present invention is applied.

In FIG. 1, a rear wheel turning system 1 comprises a rear wheel turning ratio changing means 11 which changes the ratio of the rear wheel turning angle to the front wheel turning angle, a power steering means 12, a rear wheel turning shaft 13, a displacement transmission means 14, and a hydraulic switching valve 15, and is arranged to turn the rear wheels (not shown) in response to turning of the front wheels (not shown) and to change the ratio of the rear wheel turning angle to the front wheel turning angle according to the vehicle speed.

The rear wheel turning shaft 13 extends in the transverse direction of the vehicle body and the rear wheels are connected to opposite ends of the rear wheel turning shaft 13 by way of tie rods and knuckle arms (not shown) so that the rear wheels are turned in response to displacement of the rear wheel turning shaft 13 in the transverse direction of the vehicle body.

The rear wheel turning shaft 13 is displaced in the transverse direction of the vehicle body by the rear wheel turning ratio changing means 11 and the power steering means 12. The rear wheel turning ratio changing means 11 has an output rod member 16 which is displaced in the transverse direction of the vehicle body by a distance which depends upon the turning amount of the front wheels.

The ratio of the stroke or the amount of displacement of the output rod member 16 to the turning amount of the front wheels, which corresponds to the rear wheel turning ratio, changes with the swinging angle of a yoke assembly 18 which is driven by a stepping motor 17 as will be described later. The amount of rotation of the stepping motor 17 is controlled according to the vehicle speed which is detected by a vehicle speed sensor (not shown) and the actual value of the amount of rotation of the stepping motor 17 is detected by a rear wheel turning ratio sensor (not shown) and is feedback controlled according to the output signal of the rear wheel turning ratio sensor.

The hydraulic switching valve 15 is controlled according to the stroke of the output rod member 16 of the rear wheel turning ratio changing means 11 to control the power steering system 12 to assist displacing of the rear wheel turning shaft 13.

The rear wheel turning ratio changing means 11 comprises, in addition to the output rod member 16, the stepping motor 17, and the yoke assembly 18, a bevel gear 21 and a connecting rod 24 which are housed in a casing 25 as shown in detail in FIGS. 2 to 6. The yoke assembly 18 comprises a swinging shaft member 22, a pendulum arm 23, and a swinging gear 31.

Figure 2:
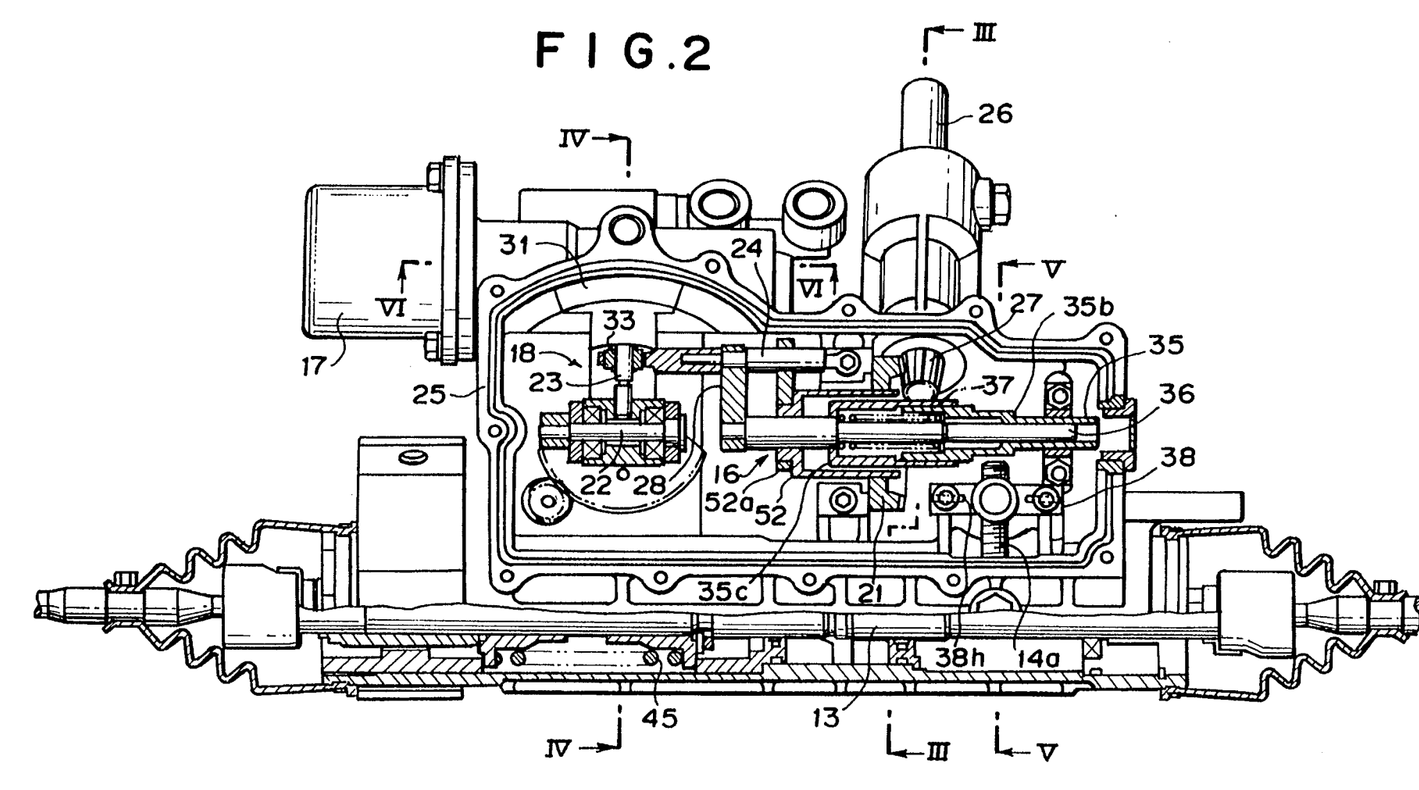
FIG. 2 is a cross-sectional view showing a rear wheel turning ratio changing means employed in the rear wheel turning system shown in FIG. 1.
Figures 3, 4:
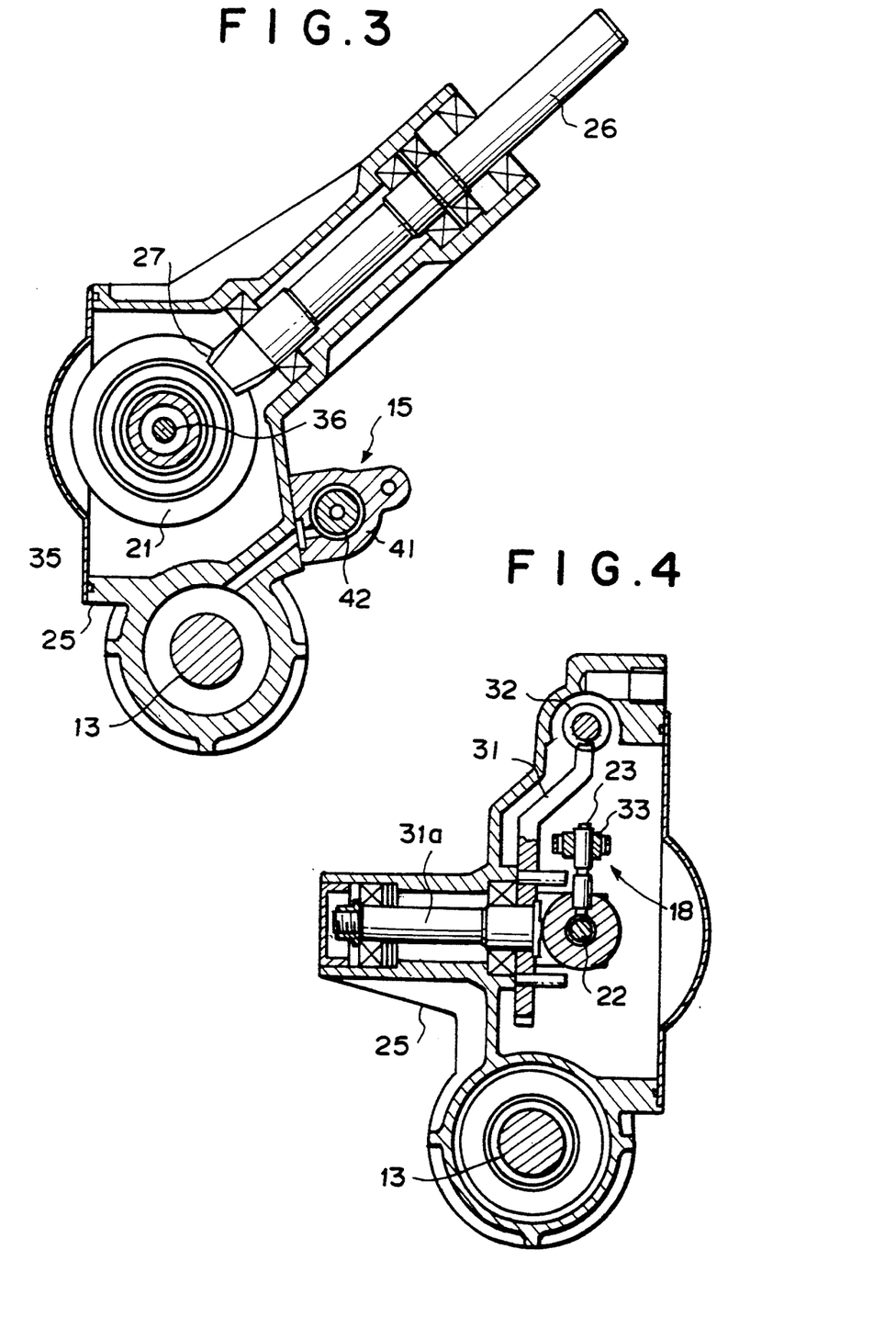
FIG. 3 is a cross-sectional view taken along line III—III in FIG. 2.
FIG. 4 is a cross-sectional view taken along line IV—IV in FIG. 2.
Figure 5:
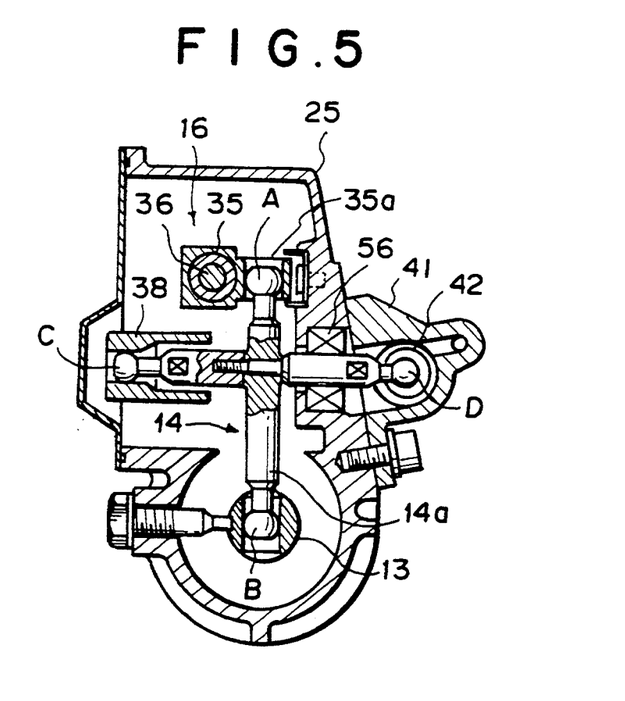
FIG. 5 is a cross-sectional view taken along line V—V in FIG. 2.

The output rod member 16 is supported in the casing 25 to be slidable in the axial direction thereof to displace the rear wheel turning shaft 13 in the axial direction thereof or the transverse direction of the vehicle by way of the displacement transmission means 14 as will be described in detail later.

The bevel gear 21 is supported on the output rod member 16 by way of a tubular support member 52 to be rotatable together and coaxially with the output rod member 16. The bevel gear 21 is in mesh with a pinion 27 provided on the rear end of an input shaft 26 which inputs the turning amount of the front wheels, and is rotated as the input shaft 26 rotates.

Figure 6:
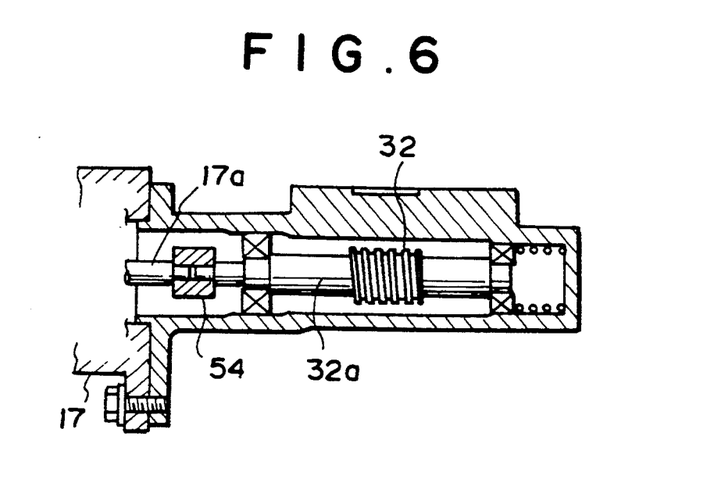
FIG. 6 is a cross-sectional view taken along line VI—VI in FIG. 2.

The swinging shaft member 22 has a rotational axis which can take a position in which it is aligned with the rotational axis of the output rod member 16 and is fixed to the swinging gear 31. The swinging gear 31 is in mesh with a worm 32 which is driven by the stepping motor 17 and is rotated about a rotational axis 31a (FIG. 4) which crosses the axis 11 of the swinging shaft member 22 and is perpendicular to the paper surface on which FIG. 1 is drawn. The swinging shaft member 22 is rotated together with the swinging gear 31. The shaft 32a of the worm 32 is connected to the output shaft 17a of the stepping motor 17 by way of a coupling 54. (FIG. 6)

The pendulum arm 23 is connected to the swinging shaft member 22 to be rotatable about the axis 11 of the swinging shaft member 22, and has an axis 12. The pendulum arm 23 is connected to the swinging shaft member 22 in such a position that the axis 12 of the pendulum arm 23 passes through the intersection of the rotational axis of the swinging shaft member 22 and the axis 11 of the same.

The connecting rod 24 has an axis parallel to the axis 13 of the output rod member 16 and to the axis of the rear wheel turning shaft 13, and is connected to the output rod member 16, the bevel gear 21, and the pendulum arm 23, thereby connecting the output rod member 16 and the yoke assembly 18. That is, an intermediate portion of the connecting rod 24 is connected to one end of a lever 28 which is fixed to one end of the output rod member 16 at the other end. The connecting rod 24 is connected to the bevel gear 21 by inserting an end portion of the connecting rod 24 into an opening in an extension 52a of the support member 52 on which the bevel gear 21 is mounted. Further, the connecting rod 24 is connected to the pendulum arm 23 by inserting the pendulum arm 23 into an insertion hole formed in a ball joint member 33 provided on the other end portion of the connecting rod 24 to be rotatable in all the directions.

That is, the connecting rod 24 is fixed to the output rod member 16 while is slidable in the direction of its axis 14 relative to the bevel gear 21 and in the direction of the axis 12 relative to the pendulum arm 23. Though the axis 12 of the pendulum arm 23 is tilted relative to the direction perpendicular to the axis 13 when the swinging shaft member 22 rotates and the pendulum arm 23 slides in the direction of the tilted axis 12, the change in the angle between the axes 12 and 14 is absorbed and the component of the force transmitted from the pendulum arm 23 to the connecting rod 24 perpendicular to the axis 13 of the output rod member 16 is absorbed at the connection of the connecting rod 24 and the pendulum arm 23, whereby a relative movement in the direction perpendicular to the axis 13 of the output rod member 16 is permitted.

Since the pendulum arm 23 (the yoke assembly 18) and the connecting rod 24 are connected to permit them to move in the direction perpendicular to the axis 13 relative to each other, the connecting point of the pendulum arm 23 and the connecting rod 24 moves on a circle or an ellipse on the outer peripheral surface of a cylinder having a predetermined radius.

By connecting the pendulum arm 23 and the connecting rod 24 to permit them to move in the direction perpendicular to the axis 13 relative to each other, the angle formed by the axis 14 of the connecting rod 24 and the axis 13 of the output rod member 16 can be made constant, whereby the displacement of the output rod member 16 for a given front wheel turning amount can be the same irrespective of the direction of the turning the front wheels.

The output rod member 16 has a rod 36 one end portion of which is connected to the connecting rod 24 by way of the lever 28 and the other end portion of which is fitted in a tubular rod guide 35 to be slidable in direction of the axis 13. The rod guide 35 and the end portion of the rod 36 are supported by the casing 25. The rod guide 35 comprises a first tubular member 35b having an engagement portion 35a which is in engagement with an engaging end portion A of the displacement transmission means 14 and a second tubular member 35c which is screwed on the first tubular member 35b. A spring 37 is disposed between the rod guide 35 and the rod 36.

When displacement in the direction of the axis 13 is transmitted from the connecting rod 24 to the rod 36, the displacement is normally transmitted to the rod guide 35 by way of the spring 37 and then to the engaging end portion A of the displacement transmission means 14 in engagement with the engagement portion 35a. However, movement of the engaging end portion A of the displacement transmission means 14 is limited, and when load heavier than the force of the spring 37 acts on the rod guide 35 upon displacement of the rod 36, the displacement of the rod 36 is absorbed by contraction of the spring 37 and is not transmitted to the rod guide 35.

The hydraulic switching valve 15 comprises a valve housing 41 and a valve spool 42 which is received in the valve housing 41 to be slidable relative to the valve housing 41 in the direction of axis 15 which is parallel to the axis 13 of the output rod member 16. The valve spool 42 is displaced by the output rod member 16 and the rear wheel turning shaft 13 by way of the displacement transmission means 14 which will be described in detail, hereinbelow. Application of hydraulic pressure to the power steering means 12 is controlled by displacement of the valve spool 42.

The rear wheel turning shaft 13 is provided with a centering spring 45, and when the hydraulic switching valve 15 and/or the power steering means 12 loses hydraulic pressure or when the mechanical system fails and the hydraulic system is drained to release hydraulic pressure from the power steering system, the centering spring 45 holds the rear wheel turning shaft 13 in the neutral position where it holds the rear wheels straight ahead. That is, in the case of failure in the systems, the centering spring 45 provides so-called fail-safe function.

The power steering means 12 has a piston 46 which is fixedly provided on the rear wheel turning shaft 13 and is received in a cylinder to form right and left hydraulic pressure chambers 43 and 44.

The displacement transmission means 14 is engaged with the valve spool 42, the rear wheel turning shaft 13, and the vehicle body (a support member 38) in addition to the output rod member 16 (the rod guide 35) so that displacement of the output rod member 16 causes the displacement transmission means 14 to displace the valve spool 42 in one direction and displacement of the rear wheel turning shaft 13 caused by the displacement of the valve spool 42 causes the displacement transmission means 14 to displace the valve spool 42 in the other direction.

That is, the displacement transmission means 14 has a cross lever 14a formed of a transverse lever and a vertical lever. The engaging end portion A which is one end portion of the vertical lever is in engagement with the rod guide 35 of the output rod member 16, and an engaging end portion B which is the other end portion of the vertical lever is in engagement with the rear wheel turning shaft 13. An engaging end portion C which is one end portion of the transverse lever is in engagement with the support member 38 which is fixed to the vehicle body, and an engaging end portion D which is the other end portion of the transverse lever is in engagement with the valve spool 42A; seal member 56 is provided on the housing 25 at the portion where the cross lever 14a passes through the housing 25. The support member 38 is bolted to the vehicle body through a pair of bolt holes 38h (FIG. 2) which are elongated holes and permit adjustment of the position of the support member 38 relative to the vehicle body within their lengths.

The engaging end portions A, B, and D are respectively engaged with the rod guide 35, the rear wheel turning shaft 13, and the valve spool 42 not to be movable in the directions of their axis and to be movable and rotatable in the other directions, and the engaging end portion C is engaged with the support member 38 by way of a ball joint (not shown) to be rotatable and not to be movable.

For example, when the output rod member 16 is displaced rightward in a state where the valve spool 42 and the rear wheel turning shaft 13 are in their respective neutral positions, the engaging end portion A of the cross lever 14a is displaced rightward together with the output rod member 16. Since counterforce of the wheels and counterforce of the centering spring 45 act on the rear wheel turning shaft 13, the engaging end portion B cannot be moved in the axial direction. At the same time the engaging end portion C is not movable. Accordingly, in response to the rightward displacement of the engaging end portion A, the cross lever 14a is tilted about the linear line which joins the engaging end portions B and C and displaces the valve spool 42 rightward by way of the engaging end portion D.

When the valve spool 42 is thus displaced rightward from the neutral position, the hydraulic pressure in the right hydraulic pressure chamber 43 increases while the hydraulic pressure in the left hydraulic pressure chamber 44 reduces, and accordingly, the power steering means 12 produces a hydraulic pressure which pushes the rear wheel turning shaft 13 leftward. The hydraulic pressure which pushes the rear wheel turning shaft 13 leftward increases with increase of the rightward displacement of the valve spool 42 until it reaches a balance position.

When the valve spool 42 is displaced by a predetermined amount from the neutral position to the balance position, the hydraulic pressure produced by the power steering means 12 balances with the external force acting on the rear wheel turning shaft 13 such as the counterforces of the centering spring 45 and wheels.

When the valve spool 42 is further displaced rightward from the balance position, the hydraulic pressure produced by the power steering means 12 overcomes the external force and the rear wheel turning shaft 13 is displaced leftward by the hydraulic pressure.

When the rear wheel turning shaft 13 is thus displaced leftward, the engaging end portion B of the cross lever 14a is displaced leftward together with the rear wheel turning shaft 13. At this time, since the engaging end portion A is immovable due to the steering wheel turning force and the counterforce of the front wheels acting on the output rod member 16 and since the engaging end portion C is immovable, the cross lever 14a is tilted about the liner line joining the engaging end portions A and C, and when the valve spool 42 returns to the balance position, the displacement of the rear wheel turning shaft 13 is interrupted.

When the output rod member 16 is further displaced rightward and the valve spool 42 is displaced rightward, the rear wheel turning shaft 13 is displaced leftward until the valve spool 42 returns to the balance position in the same manner as that described above. By repetition of this procedure, the rear wheel turning shaft 13 is displaced by an amount corresponding to the amount of displacement of the output rod member 16 and the rear wheels are turned.

When the output rod member 16 is displaced leftward, the rear wheel turning shaft 13 is displaced in the same manner except that the movements of the cross lever 14a, the valve spool 42, and the rear wheel turning shaft 13 are reversed. The operation of the valve spool 42 is substantially the same as that of the valve spool described in the aforesaid prior art (Japanese Unexamined Patent Publication No. 1(1989)-273772).

Though the rear wheel turning ratio may be variously controlled by the rear wheel turning ratio changing means 11 on the basis of various factors, in this particular embodiment, the rear wheel turning ratio is controlled according to the vehicle speed so that the rear wheels are turned in the direction opposite to the front wheels (the reverse phase: the rear wheel turning ratio is defined to be negative when the rear wheels are turned in the reverse phase) in a low vehicle speed range and in the same direction as the front wheels (the same phase) in an intermediate-to-high vehicle speed range.

Now a method of adjusting the rear wheel turning system to straight ahead (connecting the mechanical system and the hydraulic system so that the neutral of the mechanical system and that of the hydraulic system conform to each other) in accordance with an embodiment of the present invention will be described, hereinbelow.

This is effected in a state where the mechanical system (the input shaft 26 and the yoke assembly 18) has been adjusted to the neutral, the cross lever 14a has been connected to the mechanical system (to the output rod member 16 and the rear wheel turning shaft 13) with the support member 38 temporarily incorporated and the hydraulic switching valve 15 has been incorporated and with the hydraulic system applied with hydraulic pressure.

By effecting the neutral adjustment in this state, deviation from the neutral of the hydraulic switching valve itself due to inaccuracy in machining and the like can be cleared and slip of the neutrals of the systems relative to each other can be absorbed.

That is, when the support member 38 is displaced in the state described above, there exists a dead zone where the rear wheel turning shaft 13 is not displaced in response to displacement of the support member 38 and slip of the neutrals of the systems relative to each other can be absorbed by fixing the support member 38 to the position corresponding to the dead zone as the neutral position.

Figure 7:
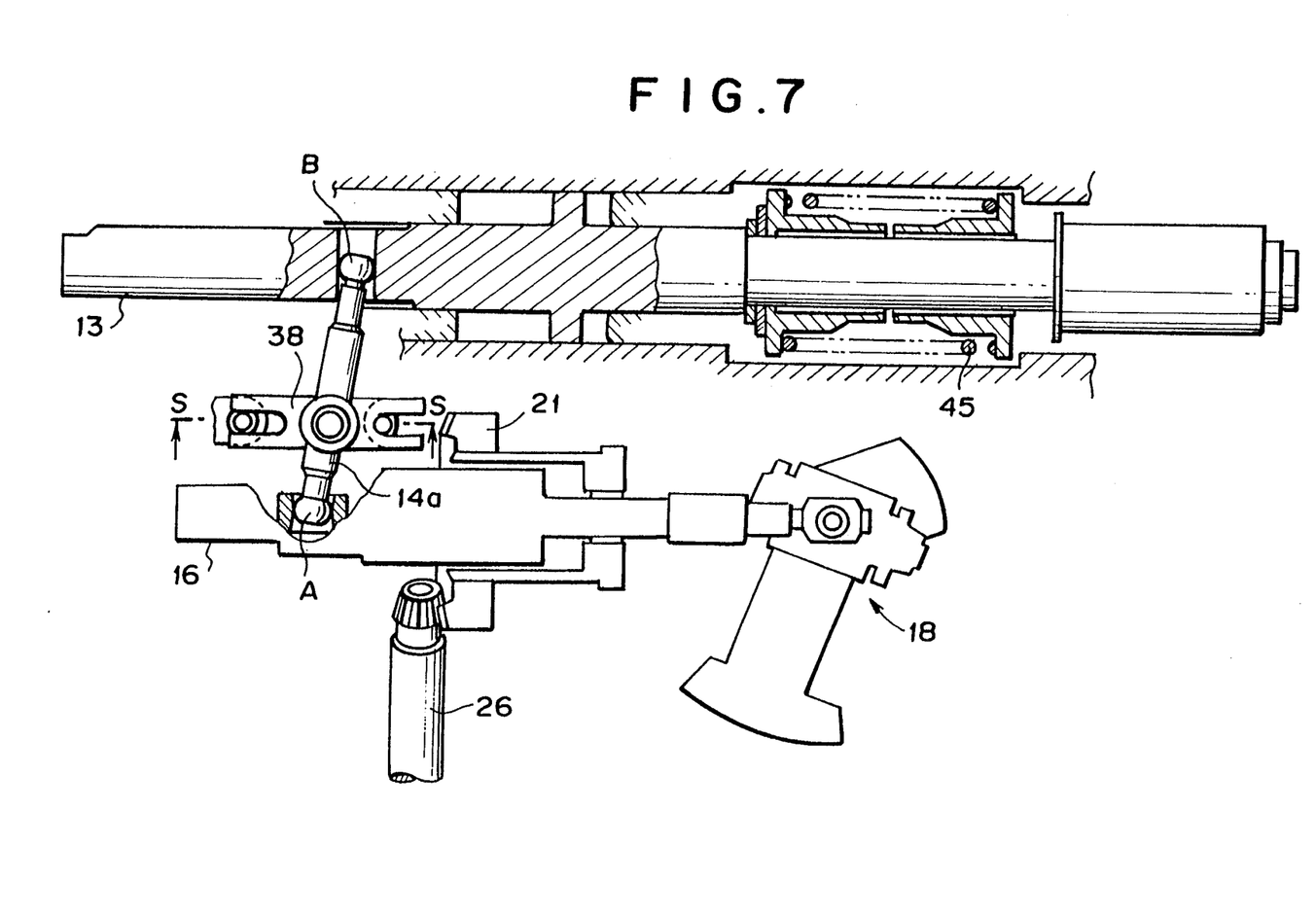
FIG. 7 is a schematic view showing the relation between the support member and the rear wheel turning system.
Figure 8:
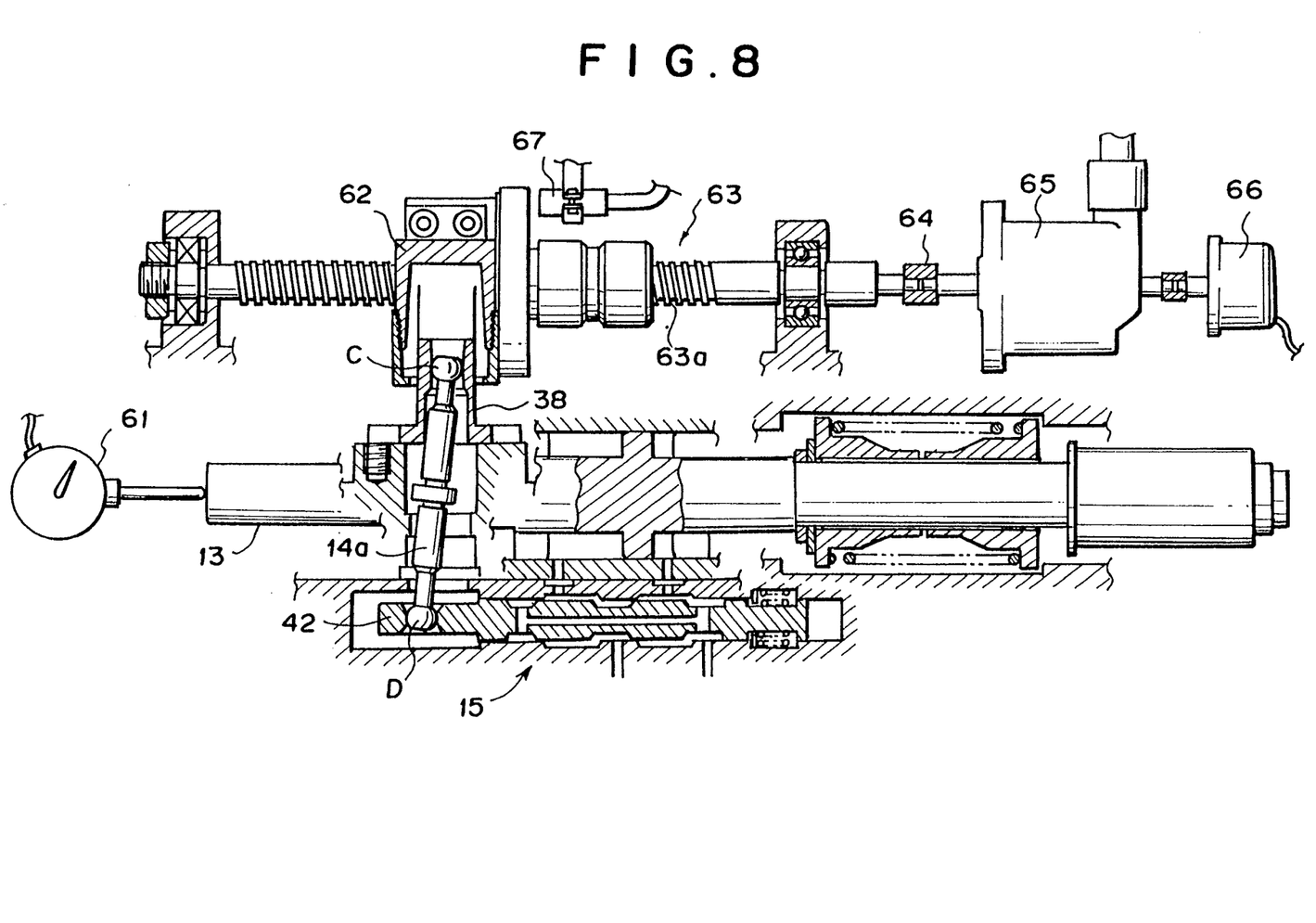
FIG. 8 is a cross-sectional view taken along line S—S in FIG. 7.

An example of the measuring system is shown in FIGS. 7 and 8. In FIGS. 7 and 8, a displacement meter 61 which measures the axial displacement of the rear wheel turning shaft 13 is applied to an end of the rear wheel turning shaft 13 and a holding member 62 which temporarily incorporates the support member 38 is provided to be movable by way of ball-screw means 63. The ball-screw means 63 has a screw rod 63a which is connected to a stepping motor 65 by way of a coupling 64 so that when the screw rod 63a is rotated by the stepping motor 65, the holding member 62 is moved in the axial direction of the screw rod 63a. The amount of rotation of the stepping motor 65 is measured by a rotary encoder 66 and the amount of displacement of the holding member 62 is detected by a non-contact distance sensor 67. The displacement meter 61, the encoder 66, and the distance sensor 67 are connected to a controller (not shown) which has a microcomputer as the major part.

The method of determining the neutral position of the support member 38 using the measuring system having the arrangement described above will be described with reference to FIGS. 9 and 10, hereinbelow.

First the neutral adjustment for the mechanical system is effected to obtain the neutral angular position of the input shaft 26 and neutral angular position of the yoke assembly 18, and then the mechanical system and the hydraulic system are connected by the cross lever 14a. Thereafter the support member 38 is temporarily incorporated in the vehicle body by the holding member 62 and the neutral adjustment for the mechanical system and the hydraulic system is effected with the hydraulic system applied with hydraulic pressure.

Figure 9:
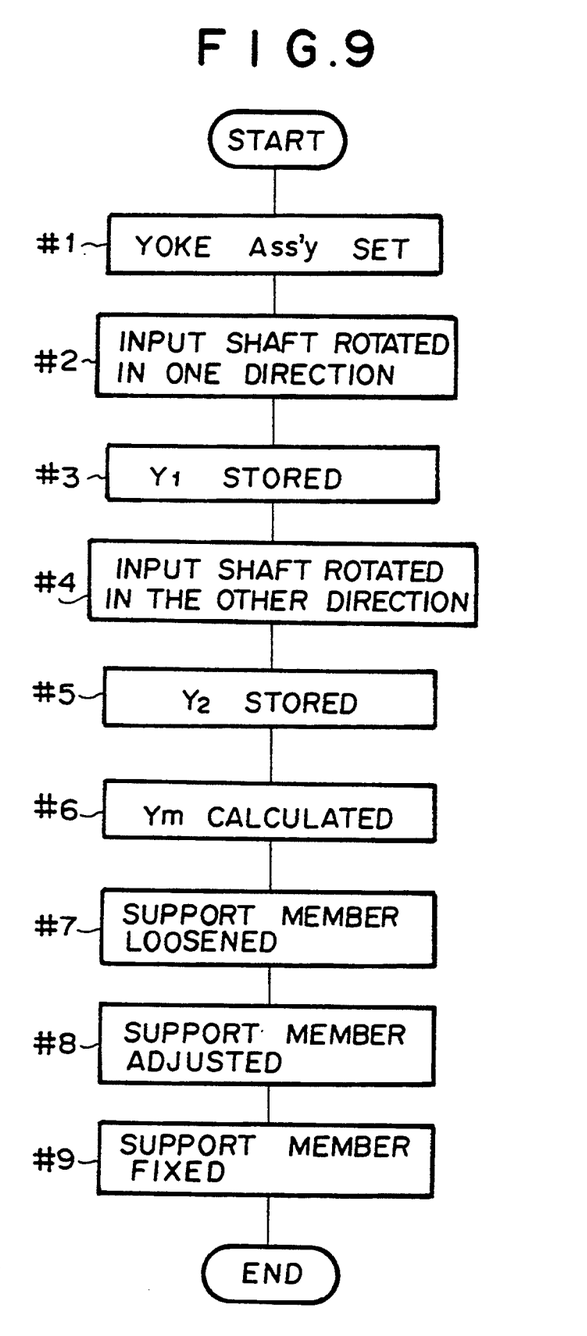
FIG. 9 is a flow chart for illustrating the method of neutral adjustment of the rear wheel turning system in accordance with an embodiment of the present invention.

That is, as shown in FIG. 9, the stepping motor 17 for the mechanical system (FIG. 1) is driven to set the angular position of the yoke assembly 18 to an arbitrary position other than the neutral position. (step #1)

Then the input shaft 26 is rotated from the neutral position by an arbitrary predetermined angle $\beta$, for instance, in the clockwise direction. (step #2)

The displacement of the rear wheel turning shaft (output shaft) 13 is defined to be positive when the input shaft 26 is rotated in the clockwise direction.

Figure 10:
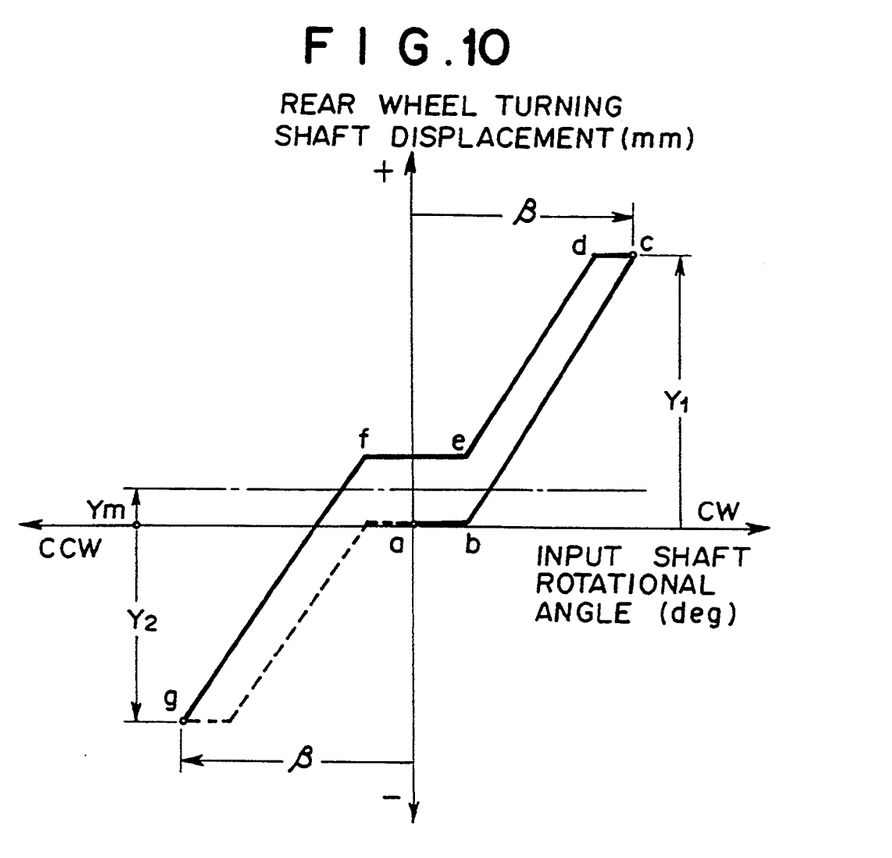
FIG. 10 is a graph showing the relation between the rotational angle of the input shaft and the displacement of the rear wheel turning shaft.

At this time, the displacement of the rear wheel turning shaft 13 changes as shown by the broken line a-b-c in FIG. 10 from the point a where the displacement is 0. While the rotating angle of the input shaft 26 is smaller than a predetermined value (between the points a and b), the rear wheel turning shaft 13 is not displaced even if the input shaft 26 rotates (a part of the dead zone).

Then a maximum displacement Y1 of the rear wheel turning shaft 13 is stored. (step #3)

Thereafter, the input shaft 26 is reversed and rotated beyond the neutral position by the predetermined angle $\beta$. (step #4) At this time, the displacement of the rear wheel turning shaft 13 as shown by the broken line c-d-e-f-g. Then a maximum displacement Y2 of the rear wheel turning shaft 13 is stored. (step #5)

Due to existence of the centering spring 45 of the rear wheel turning shaft 13 and coned disc springs on opposite ends of the centering spring 45 and due to mechanical backlash such as clearance between engagement portions, backlash of gears, and the like which is inherent to the mechanical system, there is produced hysteresis in the stroke characteristics of the rear wheel turning shaft 13. However, the hysteresis hardly affects the maximum displacements Y1 and Y2. The part of the line c-d-e-f-g between the points e and f corresponds to the dead zone during return.

Then the average Ym of the maximum displacements Y1 and Y2 is calculated (Ym=[Y1+Y2]/2). (step #6)

Then the support member 38 is once loosened (step #7) and the stepping motor 65 of the measuring system is driven to displace the support member 38 to the position in which the amount of displacement of the rear wheel turning shaft 13 is equal to the average Ym, and the support member 38 is fixed to the vehicle body in that position. (step #9)

In the state where the support member 38 is thus finally fixed to the vehicle body, the left and right maximum displacements Y1 and Y2 of the rear wheel turning shaft 13 when the input shaft 26 is rotated clockwisely and counterclockwisely by the same angle $\beta$ are equal to each other. That is, by fixing the support member 38 in the position where the amount of displacement of the rear wheel turning shaft 13 is equal to the average Ym, the neutrals of the mechanical system and the hydraulic system can be conformed to each other.

Since the hysteresis hardly affects the maximum displacements Y1 and Y2, the neutral position determined on the basis of the average Ym of the maximum displacements Y1 and Y2 is little affected by the hysteresis, whereby the neutral adjustment can be effect with high accuracy.

Now a method of adjusting the rear wheel turning system to straight ahead in accordance with another embodiment of the present invention will be described, hereinbelow.

In this embodiment, the mechanical system and the hydraulic system are first connected by the cross lever 14a, and the feeding hydraulic pressure of the hydraulic system is monitored while the support member 38 is displaced with the hydraulic pressure applied to the hydraulic system, and then the neutral position of the support member 38 is determined as the point where the feeding hydraulic pressure is minimized.

The method of this embodiment can be carried out using a measuring system substantially the same as that shown in FIGS. 7 and 8, though the displacement meter 61 is not necessary and a means for detecting the feeding pressure of the hydraulic system, for instance, on the hydraulic pressure feeding side of the hydraulic switching valve 15 (e.g., a pressure gauge) is necessary.

Figure 11:
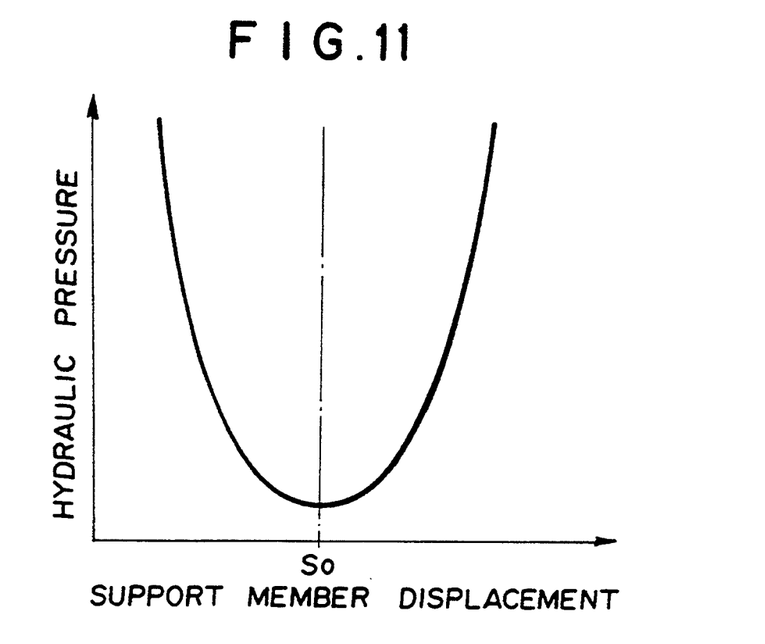
FIG. 11 is a graph showing the relation between the hydraulic pressure and the displacement of the support member in carrying out the method of neutral adjustment of the rear wheel turning system in accordance with another embodiment of the present invention.

When determining the neutral position of the support member 38 using such a measuring system, the oil pump (not shown) for the hydraulic system is first operated to apply the hydraulic system with hydraulic pressure, and then the stepping motor 65 is driven. While measuring the change in the displacement of the holding member 62 (or the support member 38), the change in the feeding pressure of the hydraulic system is monitored. At this time, the feeding pressure changes with change in the displacement of the support member 38 in the manner shown by the curve in FIG. 11, and is minimized at a certain value So of the displacement of the support member 38. The value So of the displacement of the support member 38 at which the feeding pressure is minimized corresponds to the neutral position of the support member 38 at which the hydraulic system is held neutral. Accordingly, by fixing the support member 38 to the vehicle body in the position corresponding to the value So of the displacement, the support member 38 can be fixed in the neutral position, and the mechanical system and the hydraulic system can be connected so that the neutral of the mechanical system and that of the hydraulic system conform to each other.

In order to minimize backlash between the parts, it is preferred that a means for normally urging the valve spool 42 in one direction be provided in the hydraulic switching valve 15.

Figure 12:
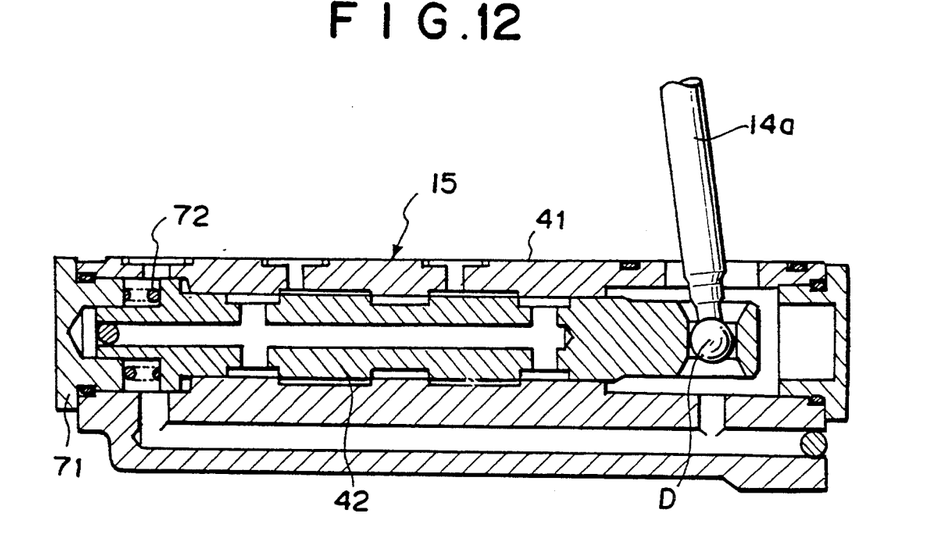
FIG. 12 is a cross-sectional view showing a preferred modification of the hydraulic switching valve.

FIG. 12 shows such a modification. That is, as shown in FIG. 12, the valve spool 42 connected to the cross lever 14a is housed in the valve housing 41 to be slidable in the axial direction and a plug 71 closes one end of the valve housing 41. A coil spring 72 is disposed in a compressed state between the plug 71 and one end of the valve spool 42 and normally urges the valve spool 42 toward the other end (the right end as seen in FIG. 12) of the valve housing 41.

Accordingly, the valve spool 42 is normally pressed against the engaging end portion D of the cross lever 14a, thereby eliminating backlash therebetween.

At the same time, the engaging end portions A, B, and C are respectively pressed against the output rod member 16, the rear wheel turning shaft 13, and the support member 38 by forces generated by the urging force of the spring 72 and backlash between these parts is also eliminated. Further a pressing in one direction acts on other gears, engaging portions, and the like of the mechanical system by way of the engaging end portions A, B, and C and backlash in the mechanical system due to the backlash between the gears and the clearance between the engaging portions is reduced.

That is, by providing the spring 72, backlash in the mechanical system is minimized in the assembled state of the rear wheel turning system and the dead zone is narrowed. As a result, the neutral adjustment between the mechanical system and the hydraulic system can be easily carried out with a high accuracy, and at the same time, the response of the rear wheels to turning of the front wheels is improved.

In the rear wheel turning systems in accordance with the prior arts, there is generally provided a spool centering spring for returning the hydraulic system to the neutral, thereby permitting the rear wheel turning shaft 13 to return to the neutral position under the force of the centering spring 45, in case of failure in the mechanical system. The spool centering spring is arranged to exert force which urges the valve spool 42 toward the neutral position only when the valve spool 42 moves away from the neutral position and to exert no force when the valve spool 42 is in the neutral position. Accordingly, the spool centering spring cannot contribute in eliminating backlash in the mechanical system. On the other hand, the spring 72 in the modification described above cannot function as such a spool centering spring for returning the hydraulic system to the neutral in case of failure in the mechanical system.

Accordingly, a fuse-like mechanism for releasing the hydraulic pressure in the hydraulic system in case of failure in the mechanical system is preferred, thereby permitting the rear wheel turning shaft 13 to return to the neutral position under the force of the centering spring 45.

An example of such a fuse-like mechanism will be described with reference to FIG. 13, hereinbelow.

Figure 13:
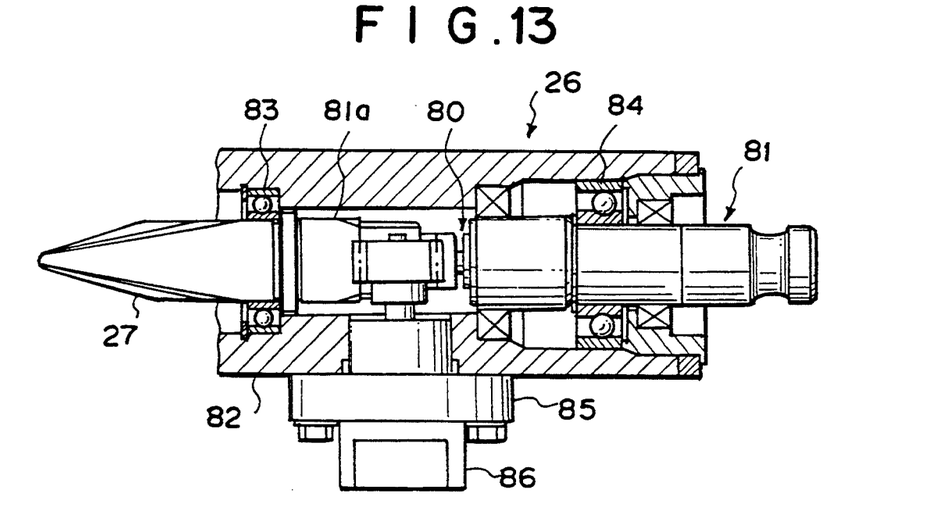
FIG. 13 is a cross-sectional view showing a preferred modification of the input shaft.

As shown in FIG. 13, the input shaft 26 comprises a shaft body 81 which is supported for rotation by a tubular casing 82 by way of a pair of bearings 83 and 84. Said pinion 27 is formed on one end of the shaft body 81. A rotational angle sensor 86 is mounted on the side of the casing 82 by way of a flange 85. An annular notch 80 which is U-shaped in cross section is provided on shaft body 81 at an intermediate portion thereof. The notch 80 is shaped and sized so that the notched portion of the shaft body 81 is the weakest in the mechanical system and will break first when excessive load acts on the mechanical system due to some failure therein. The rotational angle sensor 86 detects change in the rotational angle of the portion 81a of the shaft body 81 between the notch 80 and the pinion 27 and converts it as change in electric voltage.

A steering angle sensor which detects the turning angle of the front wheels is provided in the front wheel turning system and failure in the mechanical system is detected on the basis of the deviation of the output of the rotational angle sensor 86 from the output of the steering angle sensor. That is, when the mechanical system fails and the shaft body 81 breaks at the notched portion, turning of the front wheels is not transmitted to the portion 81a of the shaft body 81, whereby deviation is produced between the outputs of the rotational angle sensor 86 and the steering angle sensor.

Also break and/or trouble in the connecting system which connects the front wheel turning system and the rear wheel turning system can be detected on the basis of the deviation of the output of the rotational angle sensor 86 from the output of the steering angle sensor.

When the deviation of the output of the rotational angle sensor 86 from the output of the steering angle sensor exceeds a predetermined value, a signal is output to a suitable means in the hydraulic system, such as a solenoid valve 87 schematically illustrated in FIG. 1 which controls supply and release of hydraulic pressure to and from the hydraulic system, to cause it to release hydraulic pressure from the hydraulic system, thereby releasing the hydraulic pressure in the cylinder of the power steering means 12. When the hydraulic pressure in the cylinder is released, the rear wheel turning shaft 13 is permitted to return to the neutral position under the force of the centering spring 45.

As can be understood from the description above, by providing a fuse-like mechanism such as shown in FIG. 13, even the rear wheel turning system having a spring for normally urging the valve spool 42 in one direction in order to eliminate backlash can be provided with a fail-safe function for returning the rear wheel turning shaft 13 to the neutral position in case of failure in the system.

Six hydraulic switching valves in accordance with the prior arts having a spool returning spring and three hydraulic switching valves in accordance with an embodiment of the present invention having a spring for normally urging the valve spool in one direction as shown in FIG. 12 were prepared and were incorporated in a rear wheel turning system, and the widths of the dead zone were measured. The measurement was made in the following manner.

Each of the hydraulic switching valves was incorporated in the rear wheel turning system and the neutral adjustment was effected between the hydraulic system and the mechanical system. Then the rotational angle (degree) of the input shaft corresponding to the dead zone and the displacement (mm) of the valve spool when a hydraulic pressure of 15 kg/cm$^2$ acted on the hydraulic system were measured. The relief pressure of the hydraulic pump was 80 kg/cm$^2$, the rate of oil supply was 4 l/min., and the oil temperature was 45° C.

Figure 14:
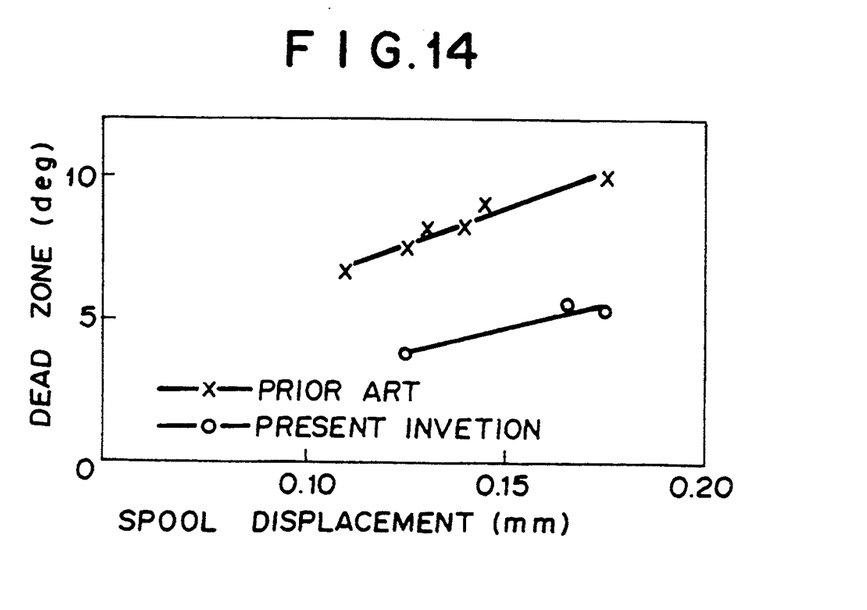
FIG. 14 is a graph showing the dead zone in the rear wheel turning system having the hydraulic switching valve shown in FIG. 12 in comparison with that in the rear wheel turning system having the conventional hydraulic switching valve.

The result was as shown in FIG. 14. As can be understood from FIG. 14, the dead zone in the rear wheel turning system provided with the hydraulic switching valve in accordance with the present invention is narrower (shown by the line attached with circles) than that in the rear wheel turning system provided with the hydraulic switching valve in accordance with the prior art (shown by the line attached with Xs) by about 4 degrees.

What is claimed is:

1. In a rear wheel turning system for a vehicle which is for turning rear wheels of the vehicle in response to turning of front wheels and has a mechanical system which displaces a rear wheel turning shaft in the transverse direction of the vehicle to turn the rear wheels and a hydraulic system which assists the mechanical system in displacing the rear wheel turning shaft, said hydraulic system comprising a piston-and-cylinder mechanism having a piston fixed to the rear wheel turning shaft and received in a cylinder to form first and second pressure chambers, a hydraulic circuit which applies hydraulic pressure to the piston-and-cylinder mechanism, and a hydraulic switching valve which can take a neutral position where it causes the hydraulic circuit to apply no hydraulic pressure to the piston, a first position where it causes the hydraulic circuit to apply hydraulic pressure to the first pressure chamber of the piston-and-cylinder mechanism and a second position where it causes the hydraulic circuit to apply hydraulic pressure to the second pressure chamber, said mechanical system comprising an input member which is connected to a system for turning the front wheels and is rotated in response to turning of the front wheels to input the amount and direction of turning of the front wheels into the mechanical system, a rear wheel turning ratio changing means which changes an amount by which an output member is displaced for a given amount of turning of the front wheels and a direction in which the output member is displaced for a given direction of turning of the front wheels according to predetermined rear wheel turning characteristics and a displacement transmission means which is connected to the output member at a first end, to the rear wheel turning shaft at a second end, to a vehicle body at a third end and to the hydraulic switching valve of the hydraulic system at a fourth end to transmit the displacement of the output member to the rear wheel turning shaft and the hydraulic switching valve, the hydraulic switching valve being to be held in the neutral position when the front wheels are in the neutral position, being to be moved to the first position when the output member is displaced in one direction and being to be moved to the second position when the output member is displaced in the other direction, a method of neutral adjustment of the rear wheel turning system comprising the steps of incorporating the rear wheel turning system in the vehicle body with said third end of the displacement transmission means temporarily held stationary in one position relative to the vehicle body, setting the rear wheel turning ratio changing means in an arbitrary position except the position where the output member is not displaced irrespective of whether the input member is rotated, rotating the input member in one direction and the other by the same angles about a neutral angular position of the input shaft where it is held when both the front wheels and the rear wheels are held straight ahead while a hydraulic pressure is applied to the piston-and-cylinder mechanism, measuring a maximum displacement of the rear wheel turning shaft when the input member is rotated in one direction and a maximum displacement of the rear wheel turning shaft when the input member is rotated in the other direction, calculating the average of the maximum displacements, and moving said third end of the displacement transmission means to the position where the rear wheel turning shaft is displaced by the average of the maximum displacements and fixing said third end of the displacement transmission means there.

2. A rear wheel turning system for a vehicle which is for turning rear wheels of the vehicle in response to turning of front wheels and has a mechanical system which displaces a rear wheel turning shaft in the transverse direction of the vehicle to turn the rear wheels and a hydraulic system which assists the mechanical system in displacing the rear wheel turning shaft, said hydraulic system comprising a piston-and-cylinder mechanism having a piston fixed to the rear wheel turning shaft and received in a cylinder to form first and second pressure chambers, a hydraulic circuit which applies hydraulic pressure to the piston-and-cylinder mechanism, and a hydraulic switching valve having a valve spool which is received in a valve housing to be movable in the axial direction to control the hydraulic pressure to be applied to the piston-and-cylinder mechanism, said mechanical system comprising an input member which is connected to a system for turning the front wheels and is rotated in response to turning of the front wheels to input the amount and direction of turning of the front wheels into the mechanical system, a rear wheel turning ratio changing means which changes an amount by which an output member is displaced for a given amount of turning of the front wheels and a direction in which the output member is displaced for a given direction of turning of the front wheels according to predetermined rear wheel turning characteristics, a centering spring which urges the rear wheel turning shaft to the neutral position, a displacement transmission means which is connected to the output member at a first end, to the rear wheel turning shaft at a second end, to a vehicle body at a third end and to the valve spool of the hydraulic switching valve at a fourth end to transmit the displacement of the output member to the rear wheel turning shaft and the hydraulic switching valve, a fuse-like mechanism having a weakened portion which is provided in a displacement transmission path between the input member and the output member which breaks when excessive load acts on the mechanical system and a hydraulic pressure releasing means which releases the hydraulic pressure in the hydraulic system when the weakened portion breaks;

wherein said hydraulic switching valve is provided with an urging means which presses the valve spool against said fourth end of the displacement transmission means in one direction.

3. A rear wheel turning system as defined in claim 2 in which said hydraulic pressure releasing means detects that the weakened portion breaks through the difference between a parameter on the turning angle of the front wheels and a parameter on the turning angle of the rear wheels.

4. A rear wheel turning system for a vehicle which is for turning rear wheels of the vehicle in response to turning of front wheels and has a mechanical system which displaces a rear wheel turning shaft in the transverse direction of the vehicle to turn the rear wheels and a hydraulic system which assists the mechanical system in displacing the rear wheel turning shaft, said hydraulic system comprising a piston-and-cylinder mechanism having a piston fixed to the rear wheel turning shaft and received in a cylinder to form first and second pressure chambers, a hydraulic circuit which applies hydraulic pressure to the piston-and-cylinder mechanism, and a hydraulic switching valve having a valve spool which is received in a valve housing to be movable in the axial direction to control the hydraulic pressure to be applied to the piston-and-cylinder mechanism, said mechanical system comprising an input member which is connected to a system for turning the front wheels and is rotated in response to turning of the front wheels to input the amount and direction of turning of the front wheels into the mechanical system, a rear wheel turning ratio changing means which changes an amount by which an output member is displaced for a given amount of turning of the front wheels and a direction in which the output member is displaced for a given direction of turning of the front wheels according to predetermined rear wheel turning characteristics, a centering spring which urges the rear wheel turning shaft to the neutral position, and a displacement transmission means which is connected to the output member at a first end, to the rear wheel turning shaft at a second end, to a vehicle body at a third end and to the valve spool of the hydraulic switching valve at a fourth end to transmit the displacement of the output member to the rear wheel turning shaft and the hydraulic switching valve; and a means for detecting the difference between a parameter on the turning angle of the front wheels and a parameter on the turning angle of the rear wheels and releasing the hydraulic pressure in the hydraulic system when the difference therebetween exceeds a predetermined value, wherein said hydraulic switching valve is provided with an urging means which presses the valve spool against said fourth end of the displacement transmission means in one direction.

* * * * *